(12) United States Patent
Naik (10) Patent No.: US 10,181,954 B2
(45) Date of Patent: Jan. 15, 2019

(54) CLOUD-BASED CODE SIGNING SERVICE—HYBRID MODEL TO AVOID LARGE FILE UPLOADS

(71) Applicant: DigiCert, Inc., Lehi, UT (US)

(72) Inventor: Alok Naik, Bangalore (IN)

(73) Assignee: DigiCert, Inc., Lehi, UT (US)

( * ) Notice: Subject to any disclaimer, the term of this patent is extended or adjusted under 35 U.S.C. 154(b) by 145 days.

(21) Appl. No.: 15/159,506

(22) Filed: May 19, 2016

(65) Prior Publication Data
US 2017/0279615 A1 Sep. 28, 2017

(30) Foreign Application Priority Data
Mar. 28, 2016 (IN) .............................. 201641010511

(51) Int. Cl.
| | | |
|---|---|---|
| H04L 29/06 | (2006.01) | |
| H04L 9/32 | (2006.01) | |
| G06F 21/51 | (2013.01) | |
| G06F 21/64 | (2013.01) | |

(52) U.S. Cl.
CPC ............ *H04L 9/3247* (2013.01); *G06F 21/51* (2013.01); *G06F 21/64* (2013.01); *H04L 63/0823* (2013.01); *H04L 63/123* (2013.01)

(58) Field of Classification Search
None
See application file for complete search history.

(56) References Cited

U.S. PATENT DOCUMENTS

| | | | | |
|---|---|---|---|---|
| 5,757,925 A | * | 5/1998 | Faybishenko | G06F 9/4443 706/47 |
| 8,572,368 B1 | * | 10/2013 | Deacon | G06F 21/64 713/158 |
| 2004/0111608 A1 | * | 6/2004 | Oom Temudo de Castro | G06F 21/40 713/156 |
| 2007/0005807 A1 | * | 1/2007 | Wong | H04L 51/063 709/246 |
| 2007/0074031 A1 | * | 3/2007 | Adams | G06F 21/629 713/176 |
| 2008/0294763 A1 | * | 11/2008 | Uchida | G06F 3/1454 709/223 |
| 2012/0284505 A1 | * | 11/2012 | Smith | H04L 61/1511 713/151 |
| 2013/0073714 A1 | * | 3/2013 | Wang | G06F 17/30578 709/224 |

(Continued)

*Primary Examiner* — Malcolm Cribbs
(74) *Attorney, Agent, or Firm* — Knobbe, Martens, Olson & Bear LLP (57) ABSTRACT

Techniques are disclosed for reducing the amount of data associated with code signing files in a cloud-based computing environment. In one embodiment, a cloud-based code signing component receives a request to sign a current version of a file. The request includes differences between the current version of the file and a previous version of the file. The cloud-based code signing component reconstructs the current version of the file based on the differences between the current version of the file and the previous version of the file. The cloud-based code signing component signs the reconstructed file, and determines differences between the signed file and the reconstructed file. The cloud-based code signing component transfers the differences between the signed file and the reconstructed file to a user.

20 Claims, 5 Drawing Sheets

(56) References Cited

U.S. PATENT DOCUMENTS

| | | | |
|---|---|---|---|
| 2013/0301890 A1* | 11/2013 | Kaempfer | H04N 19/172 382/131 |
| 2014/0050222 A1* | 2/2014 | Lynar | G06F 17/3015 370/400 |
| 2017/0093575 A1* | 3/2017 | Raju | H04L 9/0861 |
| 2017/0180133 A1* | 6/2017 | Kumar | H04L 9/3247 |
| 2017/0237569 A1* | 8/2017 | Vandervort | H04L 9/3247 713/171 |

* cited by examiner

CLOUD-BASED CODE SIGNING SERVICE—HYBRID MODEL TO AVOID LARGE FILE UPLOADS

CROSS-REFERENCE TO RELATED APPLICATIONS

The present Application for Patent claims priority to Indian Provisional Patent Application No. 201641010511, entitled "CLOUD-BASED CODE SIGNING SERVICE—HYBRID MODEL TO AVOID LARGE FILE UPLOADS," filed Mar. 28, 2016, which is assigned to the assignee of the present application and hereby expressly incorporated by reference herein in its entirety.

BACKGROUND

Field

Embodiments presented herein generally relate to techniques for code signing, and more specifically, to techniques for reducing the amount of data exchanged with a cloud based code signing service to sign new files and/or application packages.

Description of Related Art

Many software publishers, whether an individual, organization, company, etc. today provide security when deploying code (or software) to users. Code signing, for example, is frequently employed as a common security tool when deploying code. Code signing generally refers to the process of digitally signing executables and scripts to confirm the identity of the software author and guarantee that the code has not been altered or corrupted since it was signed.

In a typical code signing process, the publisher generates a private-public key pair and submits a request for a code signing certificate to a certificate authority (CA). The publisher includes the public key along with the certificate request. Once received, the CA verifies the identity of the publisher and authenticates the publisher's certificate request. Once verified, the CA issues the code signing certificate, binding the identity of the publisher with the public key. Once the publisher receives the code signing certificate, the publisher can sign the code using its private key. In some cases, the publisher can generate a hash of the code and use the private key to encrypt (or sign) the hash (e.g., using a message-digest algorithm). The publisher may bundle the signed hash, executable code, and certificate into one package. Once an end-user (e.g., individual, enterprise, etc.) receives the package, the end-user can decrypt the signed hash using the public key in the certificate, create a new hash of the executable code using the same hashing algorithm, and compare the new hash with the decrypted hash. If the two hatches match, the executable code is considered valid and can be accepted by the end-user.

In some cases, malicious actors may attempt to exploit the code signing process in order to obtain code signing certificates from trusted CAs. For example, malicious actors may attempt to gain access to end users private keys (e.g., via Trojan horses, or other malware). Once the private keys are comprised, the certificates can be used to sign malware in attempt to make the malware appear as if it comes from a legitimate software publisher.

Due, in part, to these concerns, users who want to distribute (or publish) signed code increasingly rely on cloud-based services to perform code signing. Such cloud-based code signing services, for example, generally allow users to upload code that the user wants to code sign. In response to receiving the code, the cloud-based code signing service can sign the code (e.g., in the cloud) and return the signed code to the user. In some cases, the cloud-based code signing service can store one or more private/public key pairs for a given user. The user can request that the cloud-based code signing service use a particular key pair to sign the code. By moving the management of private/public keys away from users to the cloud, cloud-based code signing services can reduce the risk of malicious actors comprising keys used to code sign software.

SUMMARY

Embodiments presented herein describe techniques for reducing the amount of data exchanged (e.g., uploaded and downloaded) with a cloud-based code signing service for code signing files.

One embodiment presented herein includes a method. The method generally includes receiving a request to sign a current version of a file. The request includes differences between a prior version of the file and the current version of the file. The method also includes reconstructing the current version of the file based on the differences between the prior version and the current version of the file, and signing the reconstructed file. The method further includes determining differences between the reconstructed file and the signed file, and transferring the differences between the reconstructed file and the signed file to a user.

Another embodiment includes a computer-readable storage medium storing instructions, which, when executed on a processor, performs an operation. The operation generally includes receiving a request to sign a current version of a file. The request includes differences between a prior version of the file and the current version of the file. The operation also includes reconstructing the current version of the file based on the differences between the prior version and the current version of the file, and signing the reconstructed file. The operation further includes determining differences between the reconstructed file and the signed file, and transferring the differences between the reconstructed file and the signed file to a user.

Still another embodiment includes a system having a processor and a memory storing a program, which, when executed on the processor, performs an operation. The operation generally includes receiving a request to sign a current version of a file. The request includes differences between a prior version of the file and the current version of the file. The operation also includes reconstructing the current version of the file based on the differences between the prior version and the current version of the file, and signing the reconstructed file. The operation further includes determining differences between the reconstructed file and the signed file, and transferring the differences between the reconstructed file and the signed file to a user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

DETAILED DESCRIPTION

Embodiments presented herein provide techniques for reducing the amount of data exchanged with a cloud-based computing environment for code signing. More specifically, embodiments presented herein can leverage knowledge of typical (software) build systems and use data comparison tools (e.g., "diff" techniques) to reduce the amount of data that is exchanged with the cloud-based computing environment.

For example, users (e.g., individuals, organizations, companies, etc.) that publish code (or software) may have an automated software build process that includes code signing. As part of the automated software build process, the user may develop and publish multiple versions of the same code, and send the code to a cloud-based code signing service for signing. Once signed, the cloud-based code signing service returns the signed code to the user.

Using "file.exe" as a reference example, the versions of "file.exe" may include a beta version, version 1.0, version 1.01, version 2.0, and so on. In many cases, these files may be similar from one build to the next build. For example, a subsequent version (e.g., version 1.0) of "file.exe" may use the same source files, class files, libraries, etc., as the previous version (e.g., beta version) of "file.exe." At the same time, there may be some differences between the different versions of the executable file. Again using "file.exe" as a reference example, each subsequent version of "file.exe" may include incremental changes, e.g., such as the addition of a library, class file, source code modifications and/or additions, etc., compared to the previous version of "file.exe." In another reference example, a user may design multiple versions of the same install package (e.g., such as "install.msi") and submit each version of the application package to a cloud-based code signing service for signing.

When interacting with cloud-based code signing services, users typically upload the entire file (or application package) to be signed to the cloud-based code signing service and (once signed by the cloud-based code signing service) subsequently download the entire signed file (or application package) from the cloud-based code signing service. Increasingly, however, the frequency of code signing requests submitted to cloud-based code signing services and the size of the files associated with the code signing requests continues to increase. In many cases, for example, cloud-based code signing services can receive several requests to sign multi-gigabyte (GB) files from multiple users in a given time period (e.g., hour, day, etc.). Consequently, users typically have to wait a significant amount of time for the code signing process, which includes uploading multi-GB files to the cloud-based computing service, waiting for the cloud-based computing service to code sign the file, and downloading the signed multi-GB files from the cloud-based computing service, to complete. Additionally, in some instances, the uploading/downloading process can take even longer in cases where users do not have internet access on each server where code signing is performed.

In one embodiment, a hybrid code signing architecture incorporates both cloud-based code signing components and on-premises code signing components. In one example, instead of interacting directly with the cloud-based code signing service (e.g., by uploading large multi-GB file code signing requests to the cloud-based code signing service), the user can interact with an on-premises code signing component. Doing so may significantly reduce the amount of data associated with a file in a code signing request. As described below, the code signing component can receive requests for signing files (from a user) and forward the requests to the cloud-based code signing service for signing. However, as opposed to forwarding the entire file to the cloud-based code signing service, the on-premises code signing component uploads the portions of the file that are different from one of several previous versions of the file.

Continuing with the "file.exe" reference example, the user can initially upload versions of the "file.exe" (previously developed by the user) to the on-premises code signing component. For example, such versions may include a base version, version 1.0, version 1.1, and so on. At the same time, the user can upload the previously developed versions of "file.exe" to the cloud-based code signing service. Once uploaded, if the on-premises code signing component receives a request from a user to code-sign a version of "file.exe." (e.g., version 1.3 of file.exe), the on-premises code signing component can compare the version 1.3 of "file.exe" to the previous versions (e.g., base version, versions 1.0-1.2) of "file.exe" (e.g., using a data comparison tool). Based on the comparison, the on-premises code signing component can determine which of the base version, versions 1.0-1.2 of "file.exe" are most similar to version 1.3 of "file.exe." In some cases, the on-premises code signing component can select version 1.2 as version 1.2 is the latest version of "file.exe" that was uploaded to the code signing component. In other cases, the on-premises code signing component can select another version (e.g., version 1.1 or the base version) of "file.exe", based on other criteria that the versions may have in common with version 1.3 of "file.exe". For example, although version 1.2 may be the latest version of "file.exe", the on-premises code signing component may determine (e.g., using a data comparison tool) that one of the previous version includes a library or portion of source code that is not present in version 1.2 of "file.exe".

Once the on-premises component identifies which of the uploaded files is most similar to the incoming file in the code sign request, the code signing component can use the data comparison tool to determine the differences between the version of "file.exe" in the code sign request and the version of "file.exe" that is most similar to the version in the code sign request. The code signing component may upload the differences to the cloud-based code signing service, as opposed to uploading the entire "file.exe" to the cloud-based code signing service. Doing so allows the on-premises code signing component to substantially reduce the amount of data that is uploaded to a cloud-based code signing service.

In one embodiment, the cloud-based code signing service may include a reconstruction feature that allows the cloud-based code signing service to reconstruct a given file based on the differences uploaded by the on-premises code signing component. Continuing with the above example, the cloud-based code signing service can reconstruct the incoming "file.exe" (based on the uploaded differences) and sign "file.exe" (e.g., using a private key held by the code signing service). In one example, instead of returning the entire signed "file.exe" to the on-premises code signing component, the cloud-based code signing service may also use a data comparison tool to determine the differences between the signed "file.exe" and the unsigned "file.exe", and return the differences between the two files to the on-premises code signing component. Once returned, the on-premises code signing component can reconstruct the signed "file.exe" and make the file available to the user to download. Doing so allows the on-premises code signing component to substantially reduce the amount of data that a user may have to download in order to receive a signed file.

Note, embodiments of the disclosure are described herein using executable file formats (e.g., such as ".exe") as a reference example of a type of file that may be code signed using the techniques presented herein. Of course, those of ordinary skill in the art will recognize that other types of executable file formats (e.g., ".cmd", ".NET", etc.) may also be submitted to a cloud-based code signing service for signing. Further, note that the techniques presented herein can also be used with any other types of files, such as application packages (or install packages), such as ".msi" files.

Figure 1:
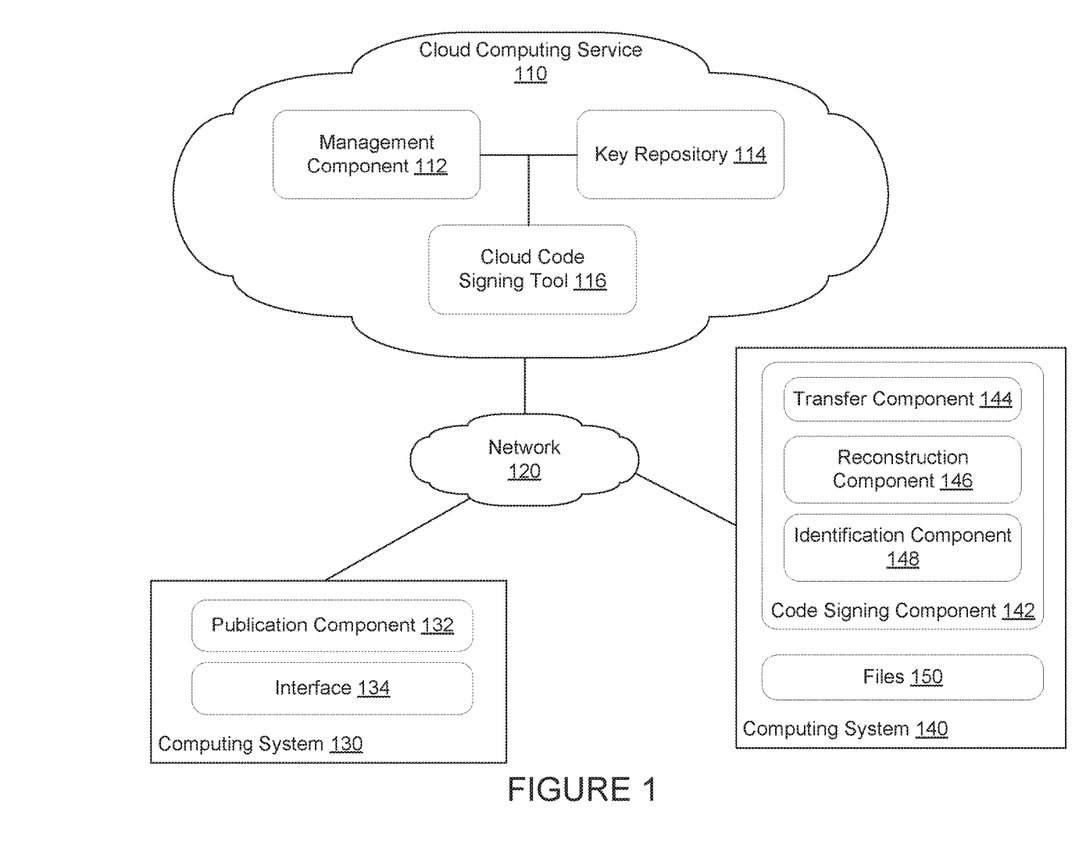
FIG. 1 illustrates an example computing environment used to provide cloud-based code signing, according to one embodiment.

FIG. 1 illustrates an example computing environment 100, according to one embodiment. As shown, the computing environment 100 includes computing systems 130, 140, and cloud computing service 110 each connected via network 120. The network 120, in general, may be a wide area network (WAN), local area network (LAN), wireless LAN (WLAN), personal area network (PAN), power line communications (PLC), a cellular network, etc. In a particular embodiment, the network 120 is the Internet. Computing systems 130, 140 can be any kind of physical computing system having a network interface such as a desktop computer, laptop computer, mobile device, tablet computer, server, embedded systems, etc.

The cloud computing service 110 generally represents any type or form of computing system that is capable of providing online hosting of virtual machine instances, applications, services, web services, storage, etc. For example, the cloud computing service 110 can provide computing resources (e.g., processing devices, host machines, virtual machines, applications, etc.), storage resources (e.g., storage systems, storage servers, physical disks, logical disks, etc.), and networking resources (e.g., network interface cards, ports, routers, switches, etc.) to one or more entities on a subscription basis. The cloud network 110 can be implemented as a Software-as-a-Service (SaaS) system, Infrastructure-as-a-Service (IaaS) system, Platform-as-a-service (PaaS) system, etc. In some embodiments, cloud network 110 can provide one or more clients (e.g., such as client computing system 130) with a view of applications and data without providing the client complete access to all underlying systems.

In one embodiment, the cloud computing service 110 is configured to provide a code signing service and/or key management service for one or more users (e.g., individuals, organizations, companies, etc.). As shown, the cloud computing service 110 includes a management component 112, key repository 114, and a cloud code signing tool 116. Each of these components may be hosted on one or more cloud computing instances. In one embodiment, the management component 112 is configured to manage code signing services and storage of public/private keys used for code signing for one or more users. For example, the management component 112 can store and protect public/private keys for one or more users in key repository 114, and interact with cloud code signing tool 116 to perform code signing services for users. In some cases, users create their own keys and store the keys in the key repository 114. In some cases, a user may request that the management component 112 create the keys in the cloud and store the keys in the key repository 114.

The computing system 130 includes a publication component 132 and an interface 134. A user may interact with the publication component 132 to design code (or software). For example, a user may use the interface 134 and/or publication component 132 to develop and/or publish code as part of a software build process. Once developed, the user can send (via the publication component 132) a request to the management component 112 to code sign the published code. As noted, however, in many cases the size of the file (or application package) within the code sign request may be significantly large (e.g., multi-GB file) such that the process of uploading the code to the cloud computing service 110, and downloading the signed code from the cloud computing service 110 takes a substantial amount of time. This increased amount of time can reduce the amount of software files that a user can create and have signed by the cloud signing service.

In one embodiment, a user can submit code sign requests to the computing system 140, which includes a code signing component 142, as opposed to directly uploading files to the cloud computing service 110. The code signing component 142 exposes application programming interfaces (APIs) or web services for code signing to users. Other functions, e.g., such as reporting, administrative controls, audits, etc. may be performed via the computing system 130 (e.g., using interface 134).

The code signing component 142 can use knowledge of typical software build systems and use "diff" techniques to reduce the amount of data that is uploaded to the cloud computing service 110 for code signing and the amount of data that is downloaded from the cloud computing service. For example, as noted, in many cases the user may have an automated software build process that involves developing code that is similar from one build to the next build. In one embodiment, these software builds (and other files used in the software build process) may be stored in the computing system 140 (e.g., shown as files 150). The files 150 may also be stored in the cloud computing service 110.

As shown, the code signing component 142 includes a transfer component 144, a reconstruction component 146, and an identification component 148. The code signing component 142 may use the transfer component 144 to handle requests (from the computing system 130) for signing files and forward the requests to the cloud computing service 110 for signing. Once signed, the transfer component 144 can receive the signed files from the cloud computing service 110. Once the code signing component 142 receives a request to code sign a particular file, the code signing component 142 can use the identification component 148 to compare the file in the request with the set of build files 150.

In some embodiments, the code signing component 142 can monitor a network folder for new files to submit to the cloud computing service 110 for code signing. Such a network folder may be stored on the computing system 130, the computing system 140, or another location (e.g., on a database). In some cases, the computing system that includes the network folder may employ client authentication to identify and/or control access to the network folder. For example, a user may be issued a client authentication certificate (from a CA), and the computing system may authenticate the user using the user's client authentication certificate. In some cases, the computing system may have knowledge of the user's client authentication certificates. One example of a client authentication method is hypertext transfer protocol (HTTP) over secure sockets layer (SSL) (HTTPS). SSL, in general, can be used to provide data encryption (e.g., of the files within the network folder), server authentication, message integrity, etc.

The identification component 148 may be used to identify which file in the set of build files 150 is most similar to the file in the request. For example, assuming that the build files 150 contain different versions of the file that is in the request, the identification component 148 can select the last updated version of the file as the version that is most similar to the file in the request. In other cases, the identification component 148 can determine which file is the most similar based on file format, size of the file, contents of the file, and other attributes. Once identified, the identification component 148 can use a data comparison tool to determine the differences between the identified file and the file in the code sign request. In one embodiment, the identification component 148 uses a binary diff tool to determine the differences between the two files. However, those of ordinary skill in the art will recognize that other data comparison tools may be used.

Once the differences between the two files are determined, the transfer component 144 may be used to upload the differences to the cloud computing service 110. Uploading the differences between the two files as opposed to the entire file in the code sign request may reduce the amount of data associated with the code sign request, and therefore reduce the amount of time that the user has to wait for the code signing process to complete. The transfer component 144 may also transmit an identifier along with the differences that specifies which file in the set of files 150 the differences were determined from.

Once received, the cloud computing service 110 may use the cloud code signing tool 116 to reconstruct the file in the code sign request and sign the reconstructed file. Assuming the "cliff" tool was used to determine the differences, the cloud code signing tool 116 can reconstruct the file based on the differences and the identified file in the set of files that the differences are based on. Once signed, the cloud code signing tool 116 may also use a data comparison tool (e.g., a "diff" tool) to determine the differences between the reconstructed file and the signed reconstructed file. Instead of returning the entire signed file to the computing system 140, the cloud code signing tool returns the differences between the two files to the computing system 140. Similar to the uploading process described above, returning only the differences between the signed file and reconstructed file may substantially reduce the amount of data that has to be exchanged between the cloud computing service 110 and the computing system 140.

The code signing component 142 may use the reconstruction component 146 to reconstruct the signed file based on the differences and the file received in the code sign request. Once reconstructed, users may download the reconstructed signed file via the transfer component 144.

In some instances, after comparing the file in the code sign request to the set of files 150, the identification component 148 may determine that the file in the code sign request is not similar to any of the files 150. Put differently, if the identification component 148 determines that the size (or number) of the differences between the file in the code sign request and the set of files 150 is greater than a threshold, the identification component 148 may alert the user that the file in the code sign request is not similar to any of the build files 150. In such a situation, the identification component 148 can scan the file in the code sign request for malware, and if the file is determined to be clean, the identification component 148 can add (e.g., upload) the file to the build files 150. The identification component 148 can also upload (via the transfer component 144) the file to the cloud computing service 110. On the other hand, if the identification component 148 determines that the file is not clean, the identification component can alert the user that there has been an attempted unauthorized use of the signing service.

Figure 2:
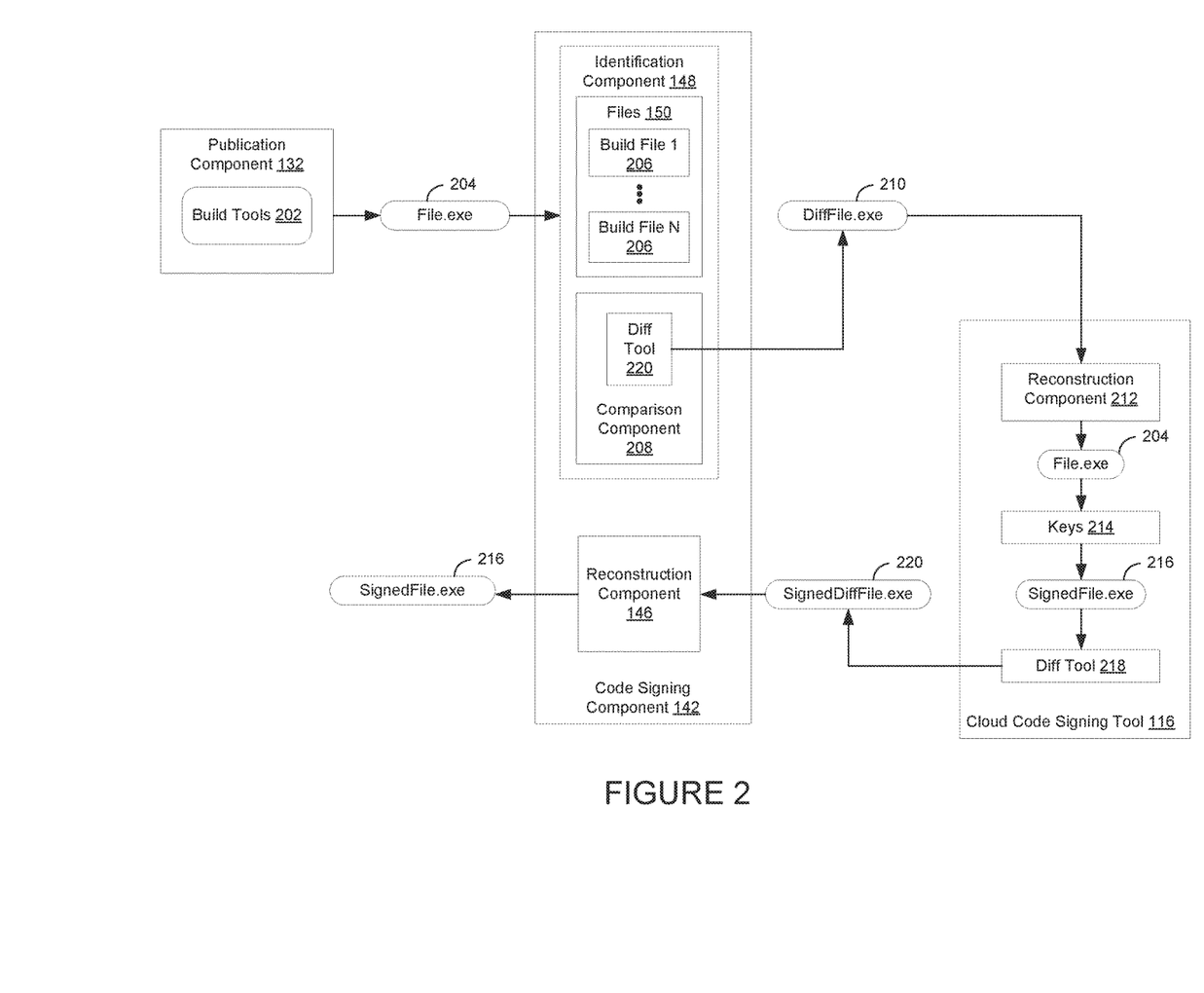
FIG. 2 illustrates components of the computing environment used to reduce the amount of data associated with code signing files in a cloud-based computing environment, according to one embodiment.

FIG. 2 further illustrates components of the cloud code signing tool 116 and code signing component 142, described relative to FIG. 1, according to one embodiment. As shown, the code signing component 142 interacts with the publication component 132 and the cloud code signing tool 116 to reduce the amount of data that is exchanged with the cloud code signing tool 116.

Illustratively, the code signing component 142 receives a file 204 from the publication component 132. File 204 may have been created from a set of build tools 202 that are used to build executable programs, application packages and/or libraries from source code. The identification component 148 may receive file 204 and use the comparison component 208 to identify which of the build files 206 in files 150 are most similar to the file 204. As noted above, in many cases, the build files 206 may be different versions of software builds that are developed from build tools 202. As described below, the code signing component 142 can leverage the knowledge of the build files 206 to reduce the size of the file 204 before it is uploaded to the cloud code sign tool 116 for code signing.

Once the comparison component 208 identifies the build file 206 that is most similar to the file 204, the comparison component 208 uses diff tool 220 to determine the differences 210 between the build file 206 and file 204. The code signing component 142 uploads the differences 210 to the cloud code signing tool 116, as opposed to the file 204, thereby reducing the amount of data that is transferred to the cloud code signing tool 116.

As shown, the cloud code signing tool 116 includes a reconstruction component 212, keys 214 and a diff tool 218. The cloud code signing tool 116 uses the reconstruction component 212 to reconstruct the file 204 based on the differences 210. For example, the reconstruction component 212 can determine the particular build file 206 that was used to determine the differences 210 based on an identifier included in the code sign request. Using the build file 206 and the differences 210, the reconstruction component 212 can reconstruct the file 204.

Once reconstructed, the cloud code signing tool 116 signs the file 204 using a private key 214 selected from the key repository 114 to create a signed file 216. The cloud code signing tool 116 uses the diff tool 218 to determine differences 220 between the signed file 216 and reconstructed file 204, and returns the differences 220 to the reconstruction component 146 within the code signing component 142. Once received, the reconstruction component 146 reconstructs the signed file 216 based on the differences 220 and file 204 received in the code sign request. Doing so in this manner allows the code signing component 142 to reduce the amount of data that is exchanged with the cloud code signing tool 116 for code signing.

Figure 3:
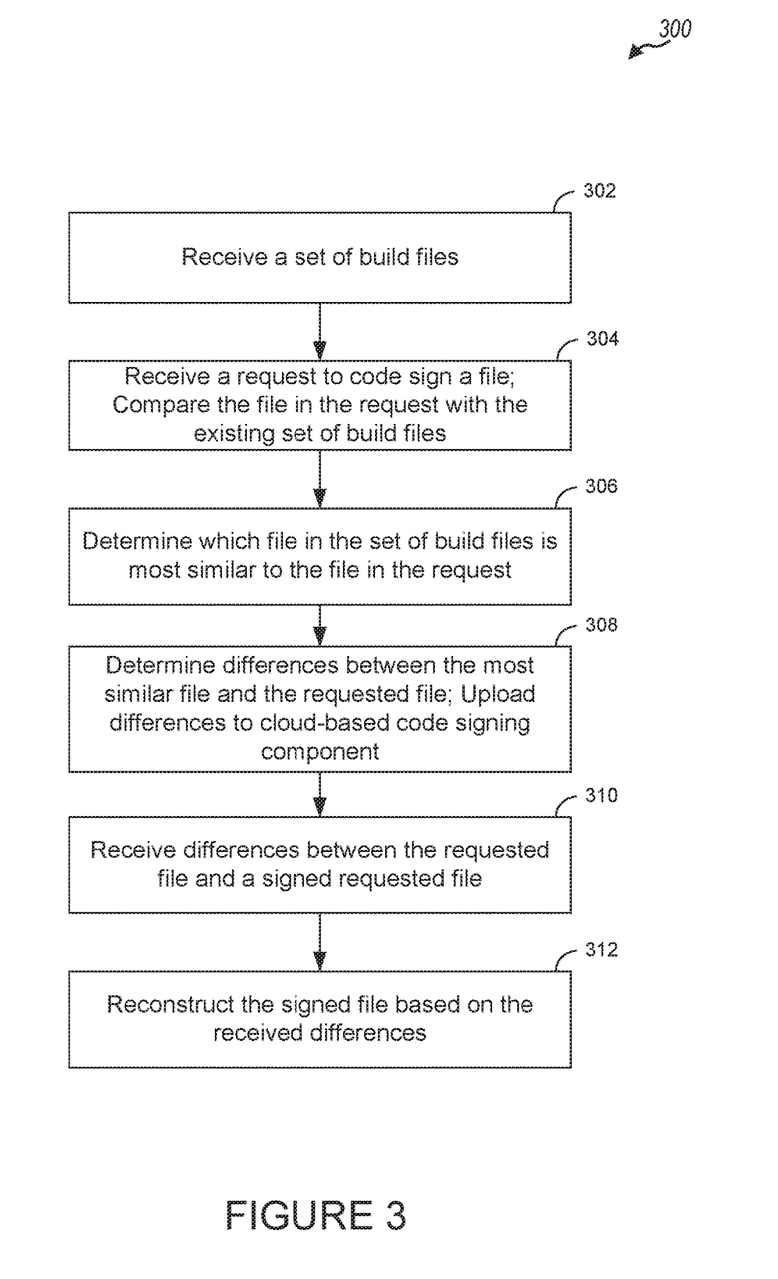
FIG. 3 illustrates a method for reducing the amount of data associated with code signing files in a cloud-based computing environment, according to one embodiment.

FIG. 3 illustrates a method 300 for reducing the amount of data associated with code signing files in a cloud-based computing environment, according to one embodiment. The method 300 can be performed by an on-premises code signing component 142. As shown, the method 300 may begin at step 302, where the code signing component 142 receives a set of build files from a user. The set of build files may include one or more versions of files (or application packages) developed by the user. At step 304, the code signing component 142 receives a request to code sign a file (or an application package), and compares the file in the request with the existing set of build files.

At step 306, the code signing component 142 determines which file in the set of build files is most similar to the file in the request. At step 308, the code signing component 142 determines the differences between the incoming file in the request and the file that is most similar to the incoming file, and uploads the differences to the cloud-based code signing component. At step 310, the code signing component 142 receives a set of differences between the incoming file in the code sign request and a signed version of the incoming file in the code sign request. At step 312, the code signing component 142 reconstructs the signed version of the file that was sent in the code sign request, based on the received differences.

Figure 4:
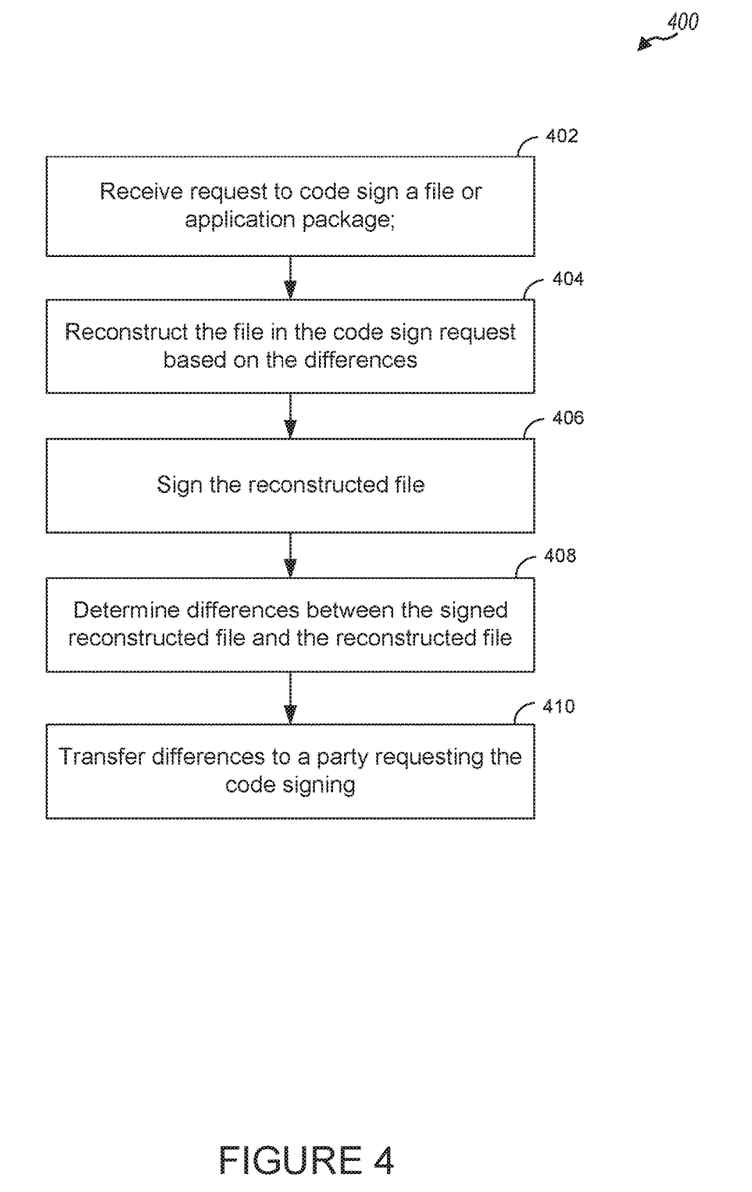
FIG. 4 illustrates a method for reducing the amount of data associated with code signing files in a cloud-based computing environment, according to one embodiment.

FIG. 4 illustrates a method 400 for reducing the amount of data associated with code signing files in a cloud-based computing environment, according to one embodiment. The method 400 can be performed by a cloud-based code signing tool 116.

As shown, the method 400 may begin at step 402, where the cloud code sign tool 116 receives a request to sign a file or application package. The request includes a set of differences between the file (or application package) and at least one build file. The request may also include an indication of the at least one build file. At step 404, the cloud code signing tool 116 reconstructs the file in the code sign request based on the differences. For example, as noted above, the cloud-based code signing tool 116 can use the indication of the build file that was used to create the diff received in the code sign request, and apply the diff to the same build file located in the cloud-based computing environment in order to reconstruct the file (or application package) in the code sign request. At step 406, the cloud code signing tool 116 signs the reconstructed file. At step 408, the cloud code signing tool 116 determines differences between the file (or application package) that has been signed and the reconstructed file (or application package). At step 410, the cloud code sign tool 116 transfers the differences to a party requesting the code signing (e.g., code signing component 142). Doing so in this manner can reduce the amount of data that is transferred to and/or from a cloud based code signing service.

Figure 5:
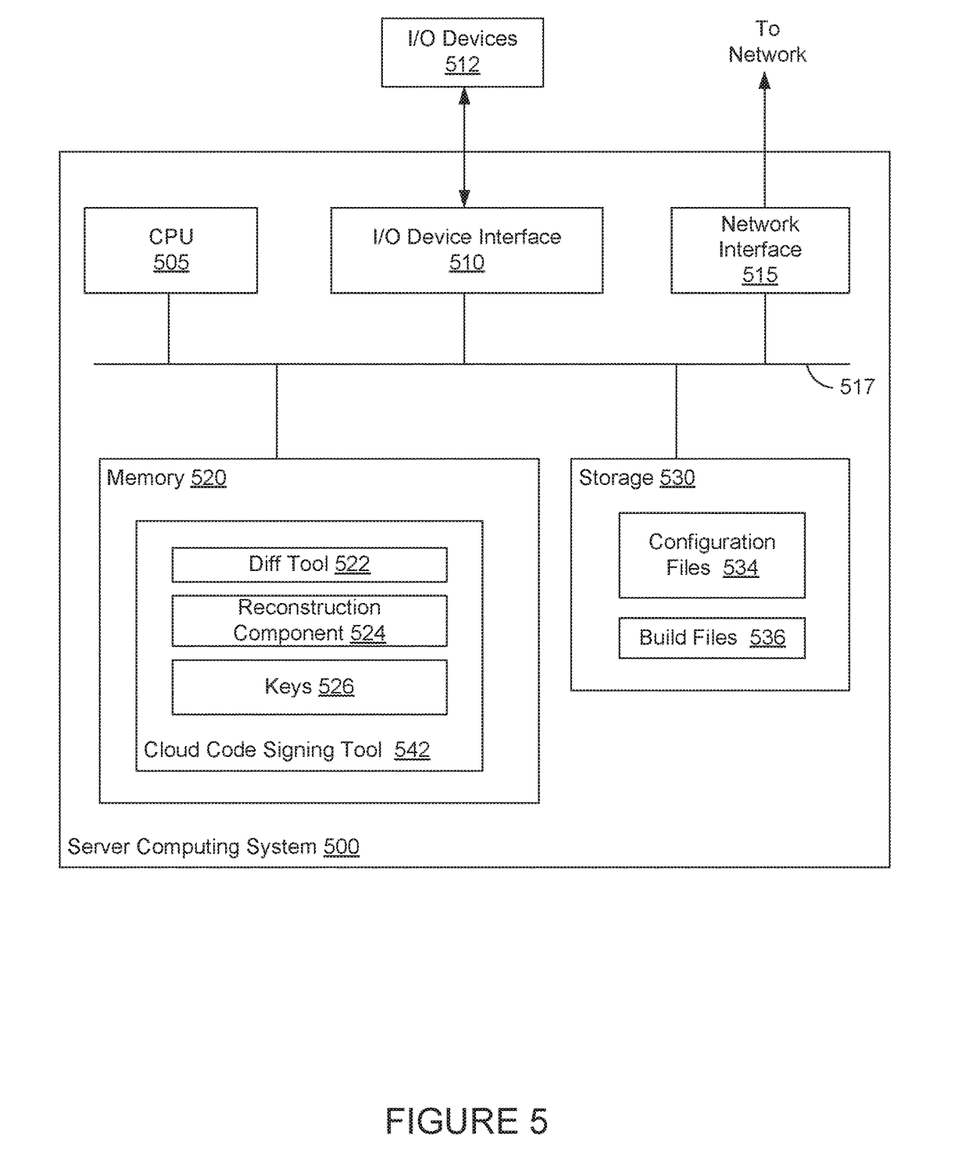
FIG. 5 illustrates an example computing system configured to reduce the amount of data associated with code signing files in a cloud-based computing environment, according to one embodiment.

FIG. 5 illustrates an example server computing system 500 configured to reduce the amount of data associated with code signing files in a cloud-based computing environment, according to one embodiment. As shown, the server computing system 500 includes, without limitation, a central processing unit (CPU) 505, a network interface 515, a memory 520, and storage 530, each connected to a bus 517. The server computing system 500 may also include an I/O device interface 510 connecting I/O devices 512 (e.g., keyboard, display, mouse devices, etc.) to server computing system 500. Further, in context of the present disclosure, the computing elements shown in the server computing system 500 may correspond to a physical computing system (e.g., a system in an enterprise network).

CPU 505 retrieves and executes programming instructions stored in memory 520 as well as stores and retrieves application data residing in the storage 530. The bus 517 is used to transmit programming instructions and application data between CPU 505, I/O devices interface 510, storage 530, network interface 515, and memory 520. Note CPU 505 is included to be representative of a single CPU, multiple CPUs, a single CPU having multiple processing cores, and the like. Memory 520 is generally included to be representative of a random access memory. Storage 530 may be a disk drive storage device. Storage 530 includes configuration files 534 and build files 536. Although shown as a single unit, storage 530 may be a combination of fixed and/or removable storage devices, such as fixed disc drives, removable memory cards, or optical storage, network attached storage (NAS), or a storage area-network (SAN).

In one embodiment, the server computing system 500 is an example of a computing device deployed in a cloud computing environment, e.g., such as cloud computing network 110. Illustratively, memory 520 includes a cloud code signing tool 542 that is configured to interact with an on-premises code signing component in order to code sign code for a user. The cloud code signing tool 542 includes a diff tool 522, a reconstruction component 524, and keys 526. Although not show, the server computing system 500 may also include a management component (e.g., management component 112) for managing code signing services and/or public/private keys, and a key repository (e.g., key repository 114).

In one embodiment, the cloud code signing tool 542 uses the reconstruction component 524 to reconstruct a file (or application package) associated with a code signing request. For example, the cloud code signing tool 542 may receive a code sign request (via the on-premises code signing component) that includes differences between a file and at least one build file. In another example, the request may include differences between an application package and another version of the application package. Once received, the reconstruction component 524 can reconstructed the file (or application package) based on the received differences.

In one embodiment, the cloud code signing tool 542 signs the reconstructed file using one of the private keys 526 stored in the cloud code signing tool 542. Once signed, the cloud code signing tool 542 uses the diff tool 522 to determine differences between the signed file and the reconstructed file. The cloud code signing tool 526 may return the differences to the on-premises code signing component.

Advantageously, the techniques described herein can substantially reduce the amount of data that is exchanged with a cloud-based computing service for code signing. Doing so can reduce the amount of time that a user has to wait when submitting code signing requests to such a cloud-based computing service.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving, at a code signing computing system, a request to sign a current version of a file from a client computing device, wherein the request is received via a data communications network and comprises differences between a prior version of the file and the current version;
   reconstructing, at the code signing computing system, the current version of the file based on the differences between the prior version and the current version of the file;
   signing, at the code signing computing system, the reconstructed file;
   determining, at the code signing computing system, differences between the reconstructed file and the signed file; and
   transferring, by the code signing computing system, the differences between the reconstructed file and the signed file to the client computing device via the data communications network, wherein the differences between the reconstructed and the signed file comprise a signature.

2. The method of claim 1, further comprising identifying the prior version of the file from a plurality of different versions of the file based on an indication of the prior version of the file included in the request.

3. The method of claim 2, further comprising:
   receiving the current version of the file if a number of the differences between the current version of the file and the prior version of the file is greater than a threshold; and
   adding the current version of the file to the plurality of different versions of the file.

4. The method of claim 1, wherein the prior version of the file is a base version of the file.

5. The method of claim 1, wherein determining the differences between the signed file and the reconstructed file comprises using a diff tool to determine the differences between the signed file and the reconstructed file.

6. The method of claim 1, wherein the reconstructed file is signed using a private key selected from a plurality of private keys.

7. The method of claim 1, wherein the code signing computer system comprises an online code signing service exposed to users over the data communications network.

8. A computer-readable non-transitory storage medium storing instructions, which, when executed by a processor, perform an operation, the operation comprising:
   receiving, code signing computing system, a request to sign a current version of a file from a client computing device, wherein the request is received via a data communications network and comprises differences between a prior version of the file and the current version;
   reconstructing, at the code signing computing system, the current version of the file based on the differences between the prior version and the current version of the file;
   signing, at the code signing computing system, the reconstructed file;
   determining, at the code signing computing system, differences between the reconstructed file and the signed file; and
   transferring, by the code signing computing system, the differences between the reconstructed file and the signed file to the client computing device via the data communications network, wherein the differences between the reconstructed and the signed file comprise a signature.

9. The computer-readable non-transitory storage medium of claim 8, the operation further comprising:
   identifying the prior version of the file from a plurality of different versions of the file based on an indication of the prior version of the file included in the request.

10. The computer-readable non-transitory storage medium of claim 9, the operation further comprising:
receiving the current version of the file if a number of the differences between the current version of the file and the prior version of the file is greater than a threshold; and
adding the current version of the file to the plurality of different versions of the file.

11. The computer-readable non-transitory storage medium of claim 8, wherein the prior version of the file is a base version of the file.

12. The computer-readable non-transitory storage medium of claim 8, wherein determining the differences between the signed file and the reconstructed file comprises using a diff tool to determine the differences between the signed file and the reconstructed file.

13. The computer-readable non-transitory storage medium of claim 8, wherein the reconstructed file is signed using a private key selected from a plurality of private keys.

14. The computer-readable non-transitory storage medium of claim 8, wherein the code signing computer system comprises an online code signing service exposed to users over the data communications network.

15. A system, comprising:
a processor; and
a memory containing a program, which when executed by the processor, performs an operation, the operation comprising:
receiving, at a code signing computing system, a request to sign a current version of a file from a client computing device, wherein the request is received via a data communications network and comprises differences between a prior version of the file and the current version;
reconstructing, at the code signing computing system, the current version of the file based on the differences between the prior version and the current version of the file;
signing, at the code signing computing system, the reconstructed file;
determining, at the code signing computing system, differences between the reconstructed file and the signed file; and
transferring, by the code signing computing system, the differences between the reconstructed file and the signed file to the client computing device via the data communications network, wherein the differences between the reconstructed and the signed file comprise a signature.

16. The system of claim 15, the operation further comprising:
identifying the prior version of the file from a plurality of different versions of the file based on an indication of the prior version of the file included in the request.

17. The system of claim 16, the operation further comprising:
receiving the current version of the file if a number of the differences between the current version of the file and the prior version of the file is greater than a threshold; and
adding the current version of the file to the plurality of different versions of the file.

18. The system of claim 15, wherein the prior version of the file is a base version of the file.

19. The system of claim 15, wherein determining the differences between the signed file and the reconstructed file comprises using a diff tool to determine the differences between the signed file and the reconstructed file.

20. The system of claim 15, wherein the reconstructed file is signed using a private key selected from a plurality of private keys.

* * * * *